No. 782,459. PATENTED FEB. 14, 1905.
S. A. MORRIS.
SEED PLANTER.
APPLICATION FILED SEPT. 26, 1904.
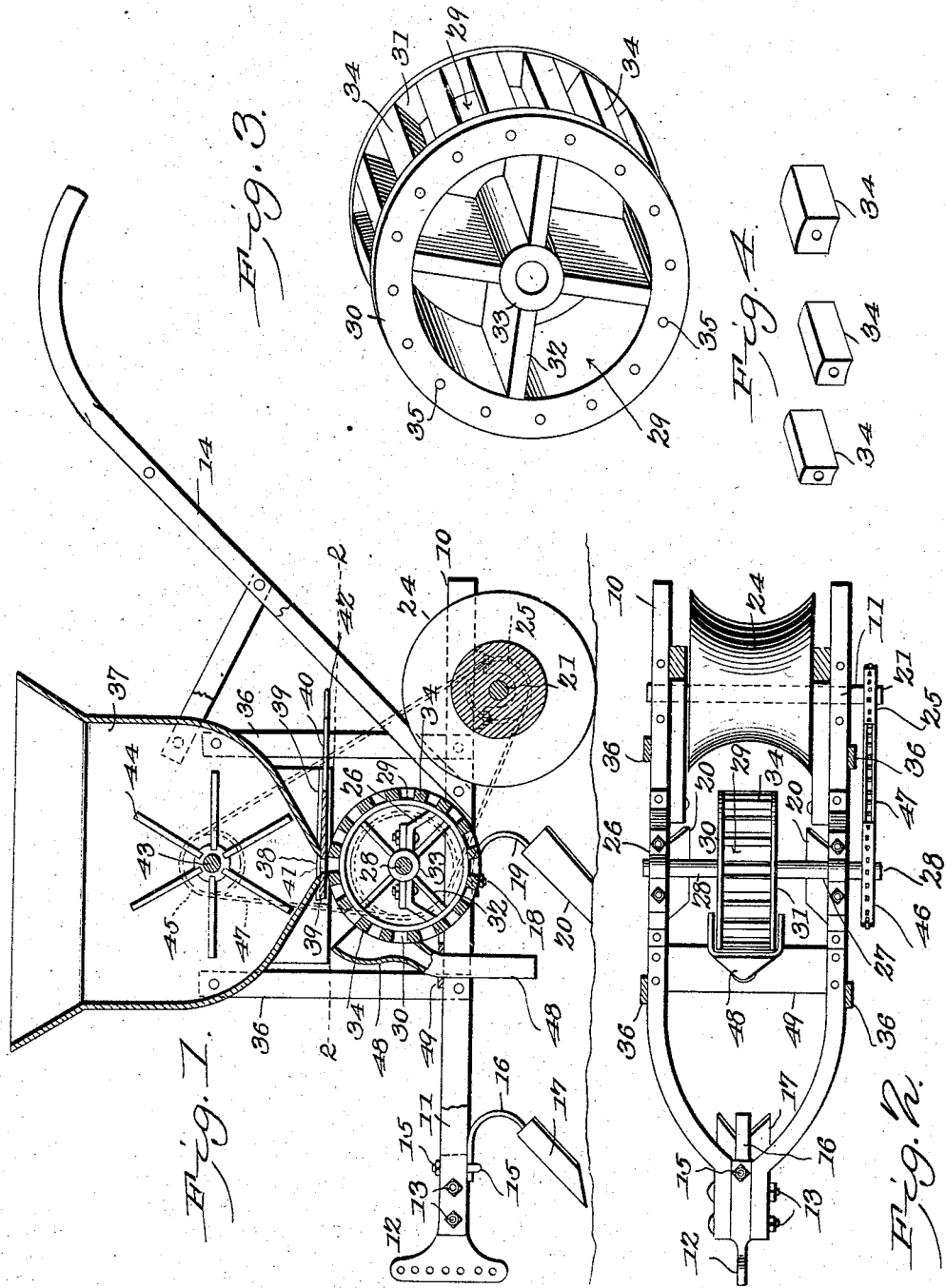
Witnesses
E. F. Stewart
C. N. Woodward.
Sidney A. Morris, Inventor
by C. A. Snow & Co.
Attorneys No. 782,459. Patented February 14, 1905.

UNITED STATES PATENT OFFICE.

SIDNEY ALBERT MORRIS, OF BUFFALO, TEXAS.

SEED-PLANTER.

SPECIFICATION forming part of Letters Patent No. 782,459, dated February 14, 1905.

Application filed September 26, 1904. Serial No. 226,026.

*To all whom it may concern:*

Be it known that I, SIDNEY ALBERT MORRIS, a citizen of the United States, residing at Buffalo, in the county of Leon and State of Texas, have invented a new and useful Seed-Planter, of which the following is a specification.

This invention relates to seeding-machines, and has for its object to provide a simply-constructed apparatus of this character wherein provision is made for planting seeds of different sizes, to provide improved means for regulating the depth at which the opening and covering plows work, to provide novel means for controlling the feed from the hopper, and to render the operation of this class of implements more effectual generally.

With these and other objects in view, which will appear as the nature of the invention is better understood, the same consists in certain novel features of construction as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a sectional side elevation. Fig. 2 is a plan view in section on the line 2 2 of Fig. 1. Fig. 3 is a perspective view, enlarged, of the seeding wheel or drum; and Fig. 4 represents a number of the detachable blocks of the seeding-drum of different sizes removed.

The improved device comprises a supporting-frame formed of spaced side members 10 11, converging at the forward ends and connected to a draft-clevis 12, as by clamp-bolts 13, and provided with guiding-handles 14 at the rear ends.

Connected, as by a clip 15, to the forward end of the frame member and centrally of the same is a spring-standard 16, carrying a furrow-opening plow member 17 on its lower end, and similarly connected, as by clips 18, to the side members 10 11 are spring-standards 19, carrying furrow-closing or covering plow members 20, while a concave roller member 24 is mounted for rotation upon the frame members rearwardly of the furrow-closers, the shaft 21 of the roller having a sprocket or chain pinion 25, from which motion is imparted to the seeding-drum and other moving parts, as hereinafter shown.

Mounted for rotation, as by standards 26 27, upon the frame members 10 11 is a shaft 28, carrying the seeding-drum, the latter formed of a band 29, having spaced outwardly-extending flanges 30 31 and connected to the shaft by radial spokes 32 and hub 33.

Inserted in the channel formed by the band 29 and flanges 30 31 are spaced blocks 34, the latter held detachably in position by screws 35 passing through the flanges. The spaces between the blocks form the seed-pockets, and by varying the sizes of the blocks the sizes of the seed-pockets may be correspondingly varied, as will be obvious. Thus when single-sized seeds are to be planted and when a smaller number of the larger seeds are to be planted a series of larger-sized blocks will be placed in position between the flanges to reduce the sizes of the pockets, and when larger pockets are required smaller blocks will be substituted. Thus by furnishing a plurality of sets of blocks of various sizes any required size of seed-pocket may be easily provided. The changes can be made in a very short time and will require but a small amount of labor.

Supported by standards 36 from the frame members 10 11 is a seed-hopper 37, contracted at the bottom and provided with a central discharge-aperture 38, slightly larger than the largest of the seed-pockets which it is possible to form by the insertible blocks 34. The seed-hopper will be so located that its discharge-aperture comes close to the upper surface of the seed-drum, and mounted to slide in guideways 39 between the feed-hopper and drum is a cut-off slide 40, having an aperture 41. The cut-off slide is operative from the rear of the seed-hopper by means of a handle 42, extended to a point convenient to the hand of the operator between handles 14. By this means the flow of seed may be easily controlled or shut off entirely, as required.

Mounted for rotation transversely through the seed-hopper 37 is a shaft 43, carrying radiating arms 44 and provided with a chain-wheel, (indicated by dotted lines 45 in Fig. 1,) and the shaft 28 is likewise provided with a chain-wheel 46 on one end, the chain-wheels 25, 45, and 46 being in alinement to receive a single endless chain. (Indicated in dotted lines 47 in Fig. 1.) By this means the seed-drum and agitator member 45 are operated from the roller member 24.

A seed-guiding tubular member 48 is provided to receive the seed falling from the pockets in the drum and conducting them to the ground in the rear of the furrower-opener 17, the seed-conductor being supported from the frame members 10 11 by a transverse plate 49.

By this arrangement of parts when the seed are to be planted, the requisite sizes of blocks 34 to correspond to the seed to be planted having been supplied to the drum, as the machine is drawn forward the furrow will be opened by the plow member 17 and the drum and agitator at the same time rotated by the chain 47, with the result of causing the pockets to be filled with seed as they consecutively pass beneath the apertures 38 41, which are carried forward and downward and discharged by gravity into the conductor member 48 and thence deposited in the furrow just in advance of the furrow-closing plow members 20 20, which cover the dropped seed, and the concave roller member compresses the earth above them, leaving them in the best possible condition for growth. The clevis member 12 provides an easy means for regulating the depth to which the plows 17 20 will work by simply adjusting the draft-clevis vertically, as will be obvious.

The spring-standards 16 and 19 of the several plows are an important feature of the construction, as they provide a yielding connection which will obviate the tendency to breakage in event of the plows striking roots, stones, or other similar obstructions.

The device may be of any required material, but will preferably be of steel and iron throughout.

Having thus described the invention, what is claimed is—

In a seed-planter, the combination with a suitably-supported hopper having a contracted discharge-aperture at its lower end, of a seed-wheel supported for rotation below said hopper; said seed-wheel consisting of a peripheral band having spokes and a hub and provided at the edges thereof with outwardly-extending flanges, and spacing-blocks mounted between said flanges equidistantly apart and secured by fastening means extending through the flanges; the spaces between said blocks and the adjacent flanges constituting pockets for the reception of seed from the hopper.

In testimony that I claim the foregoing as my own I have hereto affixed my signature in the presence of two witnesses.

SIDNEY ALBERT MORRIS.

Witnesses:
SAM W. BIGHAM,
H. H. MORRIS.